United States Patent [19]

Xu et al.

[11] Patent Number: 5,682,887
[45] Date of Patent: Nov. 4, 1997

[54] DETERMINING THE POSITION RANGE OF THE HEART FROM A SEQUENCE OF PROJECTION IMAGES USING 1-D PSEUDO MOTION ANALYSIS

[75] Inventors: Beilei Xu, Chicago, Ill.; Jin-Shin Chou, Holmdel; Jianzhong Qian, Princeton Jct., both of N.J.

[73] Assignee: Siemens Corporate Research, Inc., Princeton, N.J.

[21] Appl. No.: 618,880

[22] Filed: Mar. 20, 1996

[51] Int. Cl.⁶ ............................................. A61B 5/00
[52] U.S. Cl. ............... 128/653.1; 250/362; 250/363.01; 250/363.02; 364/413.19; 364/413.22
[58] Field of Search ........................... 128/653.1, 654, 128/659, 901; 250/362, 363.01, 363.04, 363.02; 378/37; 364/413.19, 413.22

[56] References Cited

U.S. PATENT DOCUMENTS

| | | | |
|---|---|---|---|
| 4,382,184 | 5/1983 | Wernikoff | 378/37 |
| 5,381,791 | 1/1995 | Qian | 128/659 |
| 5,421,330 | 6/1995 | Thirion et al. | 128/653.1 |
| 5,421,331 | 6/1995 | Devito et al. | 128/659 |
| 5,423,316 | 6/1995 | Hawman et al. | 128/653.1 |
| 5,429,135 | 7/1995 | Hawman et al. | 128/659 |

*Primary Examiner*—Marvin M. Lateef
*Assistant Examiner*—Eleni Mantis Mercader
*Attorney, Agent, or Firm*—Donald B. Paschburg

[57] ABSTRACT

This invention provides a method for determining the position range of the heart from a sequence of projection images which are acquired for 3-D volume reconstruction, such as SPECT myocardial projection data. The essence of this invention is the use of 1-D pseudo motion analysis so that the detection is insensitive to the image intensity distribution. Heart position is determined by comparing the sampled heart motion against a standard heart motion and determining similarities between the two as an indication of the position range of the sampled heart including the proximate center, upper and lower limits of motion.

23 Claims, 7 Drawing Sheets

DETERMINING THE POSITION RANGE OF THE HEART FROM A SEQUENCE OF PROJECTION IMAGES USING 1-D PSEUDO MOTION ANALYSIS

BACKGROUND OF THE INVENTION

1. Field of the Invention

The present invention concerns a method for determining the position range of the heart from a sequence of projection images which are acquired for 3-D volume reconstruction.

2. Description of the Prior Art

Detecting the position range of the heart is a crucial step in quantitative measurements and three dimensional (3-D) heart visualization of myocardial studies which pertain to the muscular wall of the heart. The majority of existing methods for detecting the position range of the heart are either from projection images or from reconstructed transverse images. Two dimensional transverse images are typically derived by well known medical imaging techniques such as computed tomography (CT), positron emission tomography (PET) and single photon emission computed tomography (SPECT). Computed tomography is a particular x-ray tomography method which produces axial transverse tomograms, i.e. images of body layers which are essentially perpendicular to the longitudinal axis of the body. A computer tomograph computes a two dimensional (2-D) distribution of attenuation of a pencil thin x-ray beam moved linearly in the slice plane of the object. The numerical matrix of the 2-D attenuation distribution is converted into a black and white or color television image in which each image point (pixel) corresponds to a matrix element and different gray or color tones are assigned to different attenuation values.

With a computer tomogram, an object detail exactly corresponds to an image detail and not to a large number of object elements lying behind each other in the direction of radiation. Classical x-ray techniques, which produce a photographic recording of a two dimensional shadow image of a three dimensional object area projected by the radiation cone into the image plane, suffer from blurred images of structures superimposed from different object depths. Computed tomography, however, avoids this superposition effect by only processing information on the layer, i.e. slice, of interest to the image.

Within the field of nuclear medicine imaging diagnostics, emission forms of computed tomography (ECT) provide slice images of the organ and tissue function, regional blood flow and regional metabolism by measuring emitted radiation in the areas of interest and generating an image corresponding to the emitted radiation measured. Likewise, ECT methods can be utilized to provide projection images of human body parts or organs of interest. ECT with positron emitting isotopes is known as positron emission tomography (PET), and ECT with gamma photon emitting isotopes is known as single photon emission computed tomography (SPECT). In general, a rotating gamma camera head based on the known Anger principle is used for SPECT. In a manner similar to CT, data is collected and reconstructed to the slice image. Naturally occurring radiation or externally introduced radiation may be used as the source of radioactivity for imaging. As in CT, the intensity of the pixels describe the spatial relationship of the structure of the object or human organ being imaged. It is this image (pixel) intensity feature which is utilized to determine feature locations of the object being imaged.

With the present method a series of images are generally acquired at uniformly spaced angular positions around a patient's body for obtaining projection images of the organ of interest. In 3-D tomographic myocardial studies, such as CT, PET and SPECT discussed above, a plane circular orbit around the patient is commonly used for the camera. The fact that these methods are intensity distribution dependent makes them vulnerable to noise and particularly unreliable when the dominant intensity comes from the surrounding organs, such as the liver or spleen. Consequently, a method is needed for the detection of the position range of the heart which is insensitive to the intensity distribution of images which may represent more than the object organ of interest.

The present method of determining the position range of the heart from a sequence of projection images using a one dimensional pseudo analysis is not taught by the prior art. U.S. Pat. No. 5,381,791, entitled to "Automatic Identification of Anatomical Features of Interest From Data Acquired in Nuclear Medicine Studies and Automatic Positioning of Scintillation Cameras to Carry Out Such Studies at Optimal Positions", issued to Qian, discloses defining a region of interest in which an anatomical feature of interest may be located. However, Qian does not disclose determining the position range of the heart from a sequence of projection images using one dimensional pseudo motion analysis.

Accordingly, it is an object of the present method to disclose a method for determining the position range of the heart which is relatively independent of the intensity distribution of projection images. More particularly, it is an object of the present method to determine the position range of the heart from a one dimensional pseudo motion that is derived from a sequence of projection images of the heart.

SUMMARY OF THE INVENTION

The present method determines a position range of the heart from a sequence of projection images of the heart. The projection images contain intensity distributions which are used to describe the heart in the sequence of projection images. In particular, the changes in pixel position of the maximum intensity values represent the heart motion in the sequence of projection images. A one dimensional pseudo motion analysis of the heart, derived from the sequence of projection images, is compared against a standard one dimensional pseudo motion for determining the position range of the heart. The one dimensional pseudo motion analysis includes generating an intensity feature to position mapping producing an image intensity band representing the motion of the heart through its position range. The standard one dimensional pseudo motion is obtained from a large number of sampled heart motions of patients.

Determining the position range of the heart entails deriving a variance of difference plot for the heart of interest from the standard heart motion. The low point in the variance of difference plot indicates the proximate center of the heart, and the peaks about the low point roughly represent the upper and lower limits of the heart motion. The upper and lower limits of the heart are determined by receding away from the peaks toward the proximate center in proportion to the image intensity band in the intensity feature to position mapping.

Conventional imaging methods, such as CT, PET and SPECT, for estimating the region of interest for an object are intensity distribution dependent making them vulnerable to noise and particularly unreliable when the dominant intensity comes from the surrounding organs, such as the liver or spleen. The present method by comparing the imaged heart against a standard heart motion for determining the position range, is insensitive to the intensity distribution of images which may represent more than the object organ of interest.

BRIEF DESCRIPTION OF THE DRAWINGS

The invention will be better understood with reference to the following illustrative and non-limiting drawings, in which.

DETAILED DESCRIPTION OF THE INVENTION

Although the present invention can be used in many different applications where the movement range of a cyclical moving object can be solved by the invention, the present invention is especially suited for use with computer tomography methods for three dimensional (3-D) volume reconstruction. Accordingly, the present invention will be described in conjunction with determining the position range of a heart for three dimensional volume reconstruction by known computer tomography methods.

Detection of the position range of the heart, i.e. the upper and lower limits of heart positions, is a crucial step in quantitative measurements and 3-D heart visualization of myocardial studies. Most current methods for determining the position range of the heart are either from projection images or from reconstructed transverse images by known imaging techniques. However all these methods are dependent on the intensity distribution of the image generated to convey spatial relationships for the structure being imaged. The dependence on intensity distribution renders these through 105 are discussed in conjunction with the remaining FIGS. 2 through 9. Initially a sequence of projection images are usually acquired by rotating an imaging camera around the patient's body 101. FIG. 2 illustrates imaging a projection of objects 202 and 203 onto a camera surface 201 that is rotating about the transverse axis 204. As the camera surface 201 changes its angular position (also referred to herein as row) with respect to the transverse axis 204, the location of the projection images 202' and 203' on the camera surface 201 will change. Likewise, for a camera surface rotating about a patient's body, viewing from the camera's perspective the patient's body is rotating around an axis. An organ located off center from the apparent axis of rotation will move along an orbit with a certain radius and the projection of this orbit will form a segment of straight line 301. If the sequence of projection images is viewed as a movie, each individual organ in the patient's body will follow a unique one dimensional (1-D) pseudo motion defined by the straight line 301 shown in FIG. 3.

Figure 3:
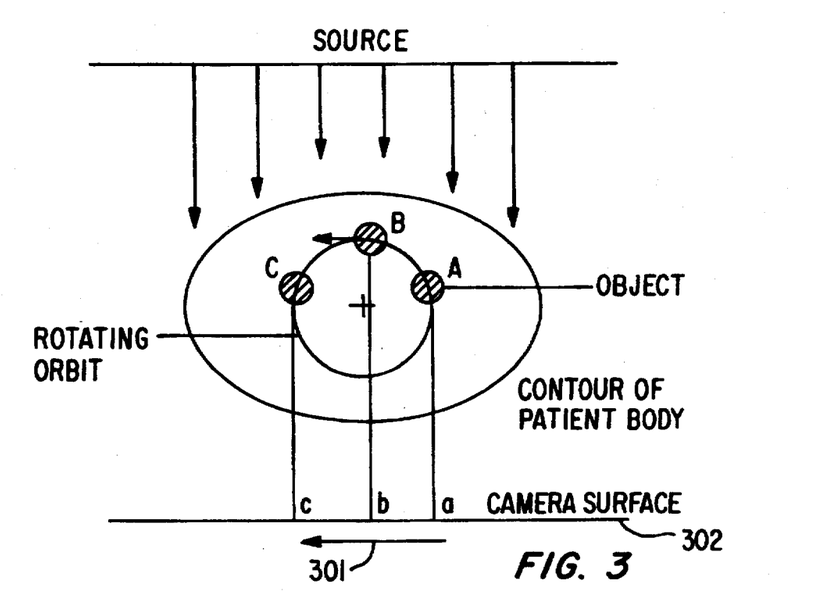
FIG. 3 shows an example of 1-D pseudo motion.

The 2-D figure in FIG. 3 demonstrates the 3-D process of projecting an object to the camera surface 302 as the object is moving along its orbit. When the object is sweeping through A, B and C, its projection onto the camera surface moves from a, b, and c respectively. This motion from a, b to c defines the 1-D pseudo motion. For objects which are not moving along the same orbit or which are starting from a different location, their 1-D pseudo motion leaves a distinguishable signature such as moving at a different speed and/or moving in a different direction.

Figure 4:
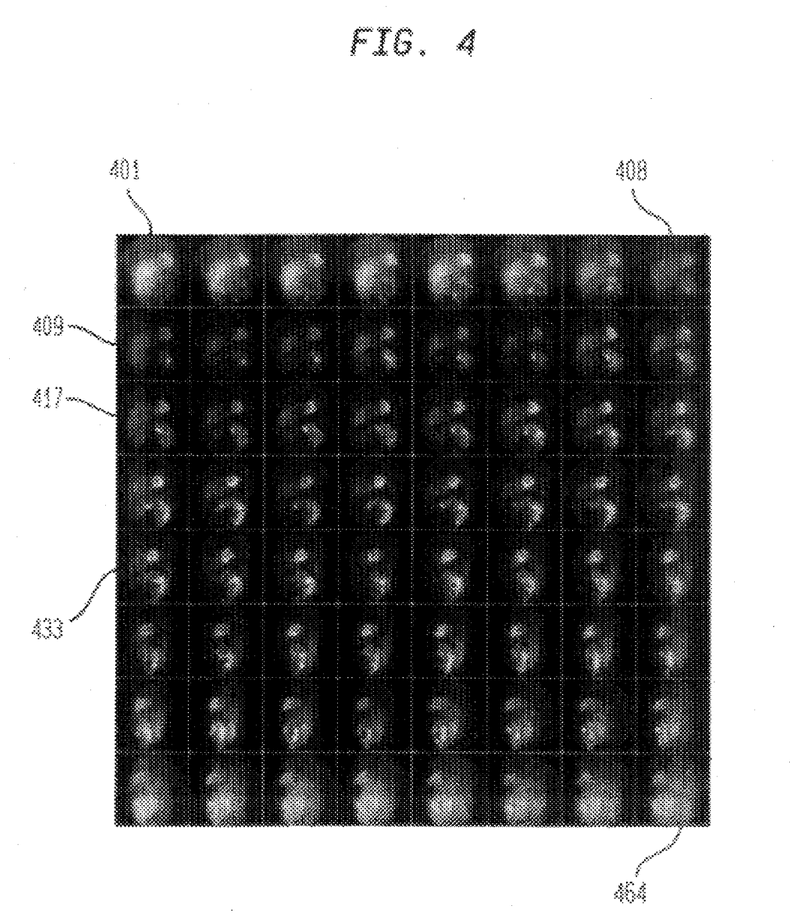
FIG. 4 shows a set of projection images of a SPECT myocardial study.
Figure 5:
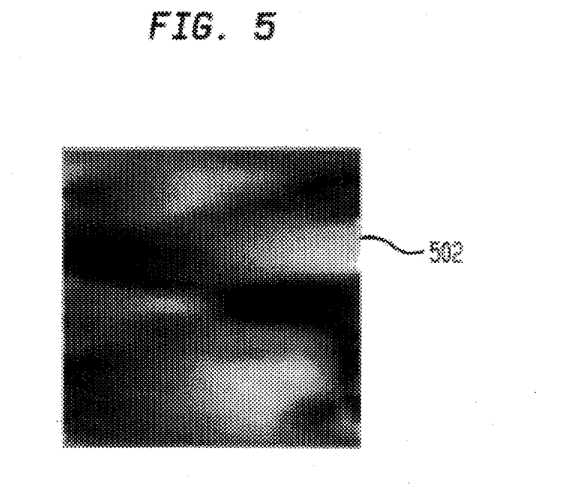
FIG. 5 shows an intensity to position mapping.

A set of projection images in accord with the present method of a SPECT myocardial study is shown in FIG. 4. The 8 by 8 matrix shown is a convenient form for showing 64 projection images obtained by rotating the camera about a patient and making projection images at 64 distinct angular positions or rows with respect to the center of rotation 101. Alternative embodiments of the present method may show different numbers of projection images represented in a different 2-D matrix form, such as a 64 by 32 matrix of projection images. The first angular camera position or row 401 is at the upper left, the eighth angular camera position or row is at the upper right 408, the ninth angular position or row is at the upper left second from the top 409. The angular camera positions or rows follow this pattern of left to right and top to bottom down to the last angular position 464. The structure of the heart, which inherently indicates By recording the column position of the maximum intensity value in each row of the projection images (in FIG. 4) with respect to acquisition angle or projection angle, a one to one correspondence of intensity feature to position mapping (IFTP), such as the image shown in FIG. 5. A single two dimensional (2-D) representation of the 3-D position movements of the heart is obtained by collapsing together the image intensity distributions of all the angular projection images obtained above 401 to 464, such as shown in FIG. 5. In FIG. 5, horizontal direction x represents the indices of the projection images while the vertical direction y is the row number in the projection images. The intensity value at any point in the 2-D image of FIG. 5 is equal to the column position of the maximum value found at y row and r angle in the sequence of projection images. Each row represents the motion of a particular body structure. Other intensity features can also be used for IFTP mapping, such as minimum intensity or minimum/maximum gradient values.

The 2-D image in FIG. 5 shows four discernable band areas of image intensity concentrations. The upper right band 502, with its image intensity pixel pattern correlating to spatial position, represents the position range of the heart through its upper and lower limits. The image intensity band 502 representing the position range of the heart serves as a basis for size constraint in further determining the angular camera positions or rows corresponding to the upper and lower limits of the heart position range.

Figure 6:
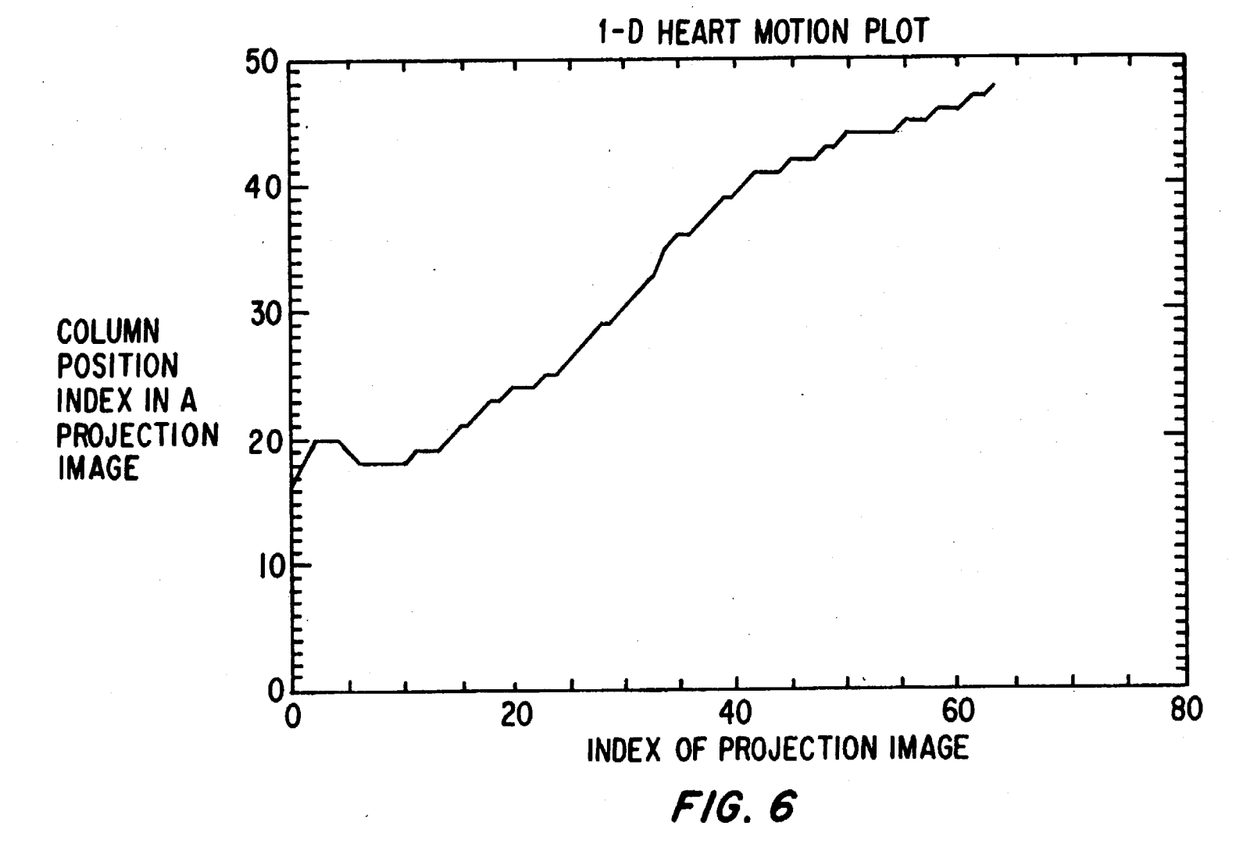
FIG. 6 is a graph of the estimation of heart motion in the sequence of projection images.

Separating the heart motion from its surrounding organs requires knowledge of how the heart is moving in the sequence of projection images. One way based on theoretical calculation provides for computing the heart motion by modelling a 3-D torso with a heart consisting of the following parameters: size of torso, location of the heart, center of rotation and image resolution. Another way is based on a sample from empirical data. In human studies, information of the distance from the heart to the center of the patient's body is not available, therefore, it is more feasible to estimate the heart motion from large samples rather than using theoretical calculations. FIG. 6 is a trace of a heart motion sampled from a test data base.

The present method undertakes a comparative analysis of the sampled sequence of projection images with a standard 1-D heart motion plot derived from averaging the heart motion plot of a large number of people. The 1-D plot of FIG. 6 is the average column position of the heart in projection images with the projection number (angular position of the camera) taken from a large number of patients. This standard 1-D heart motion plot represents the 1-D signature at the heart center. A similar signature can also be found within the upper and lower position limits of the human heart. Based on the above standard 1-D heart motion, a similarity measure is used to compare against all the potential heart positions in FIG. 5. The result of the similarity measure provides the basis for determining the heart position range limits and excluding other organ structures.

Figure 1:
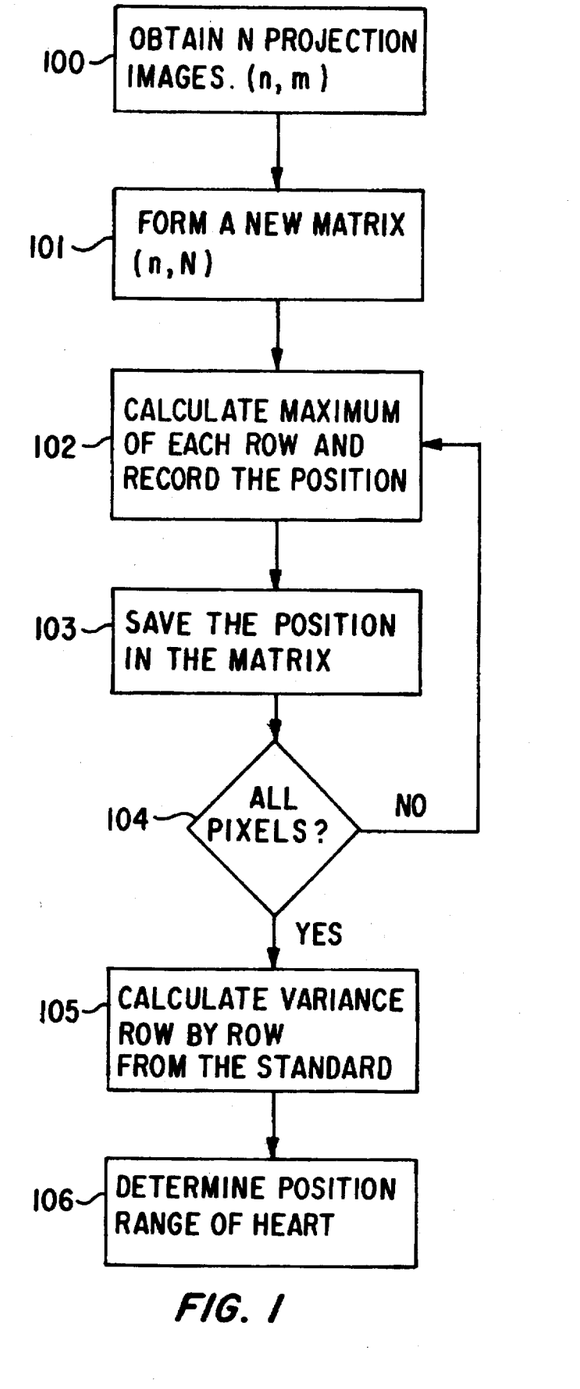
FIG. 1 is a flowchart of the process in accord with the present invention.
Figure 2:
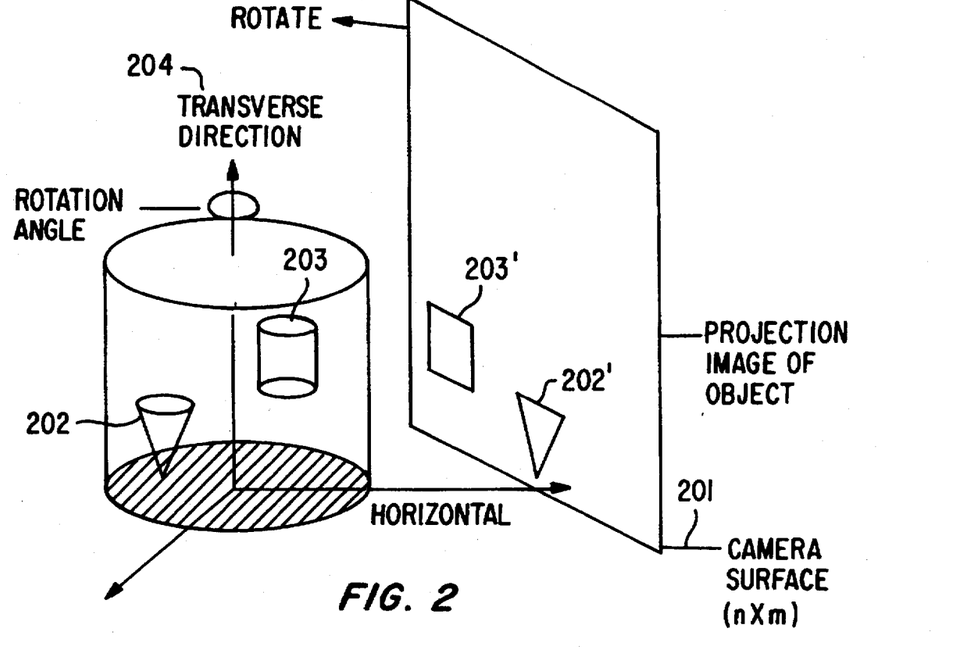
FIG. 2 shows the relationship between object and projection image.
Figure 7:
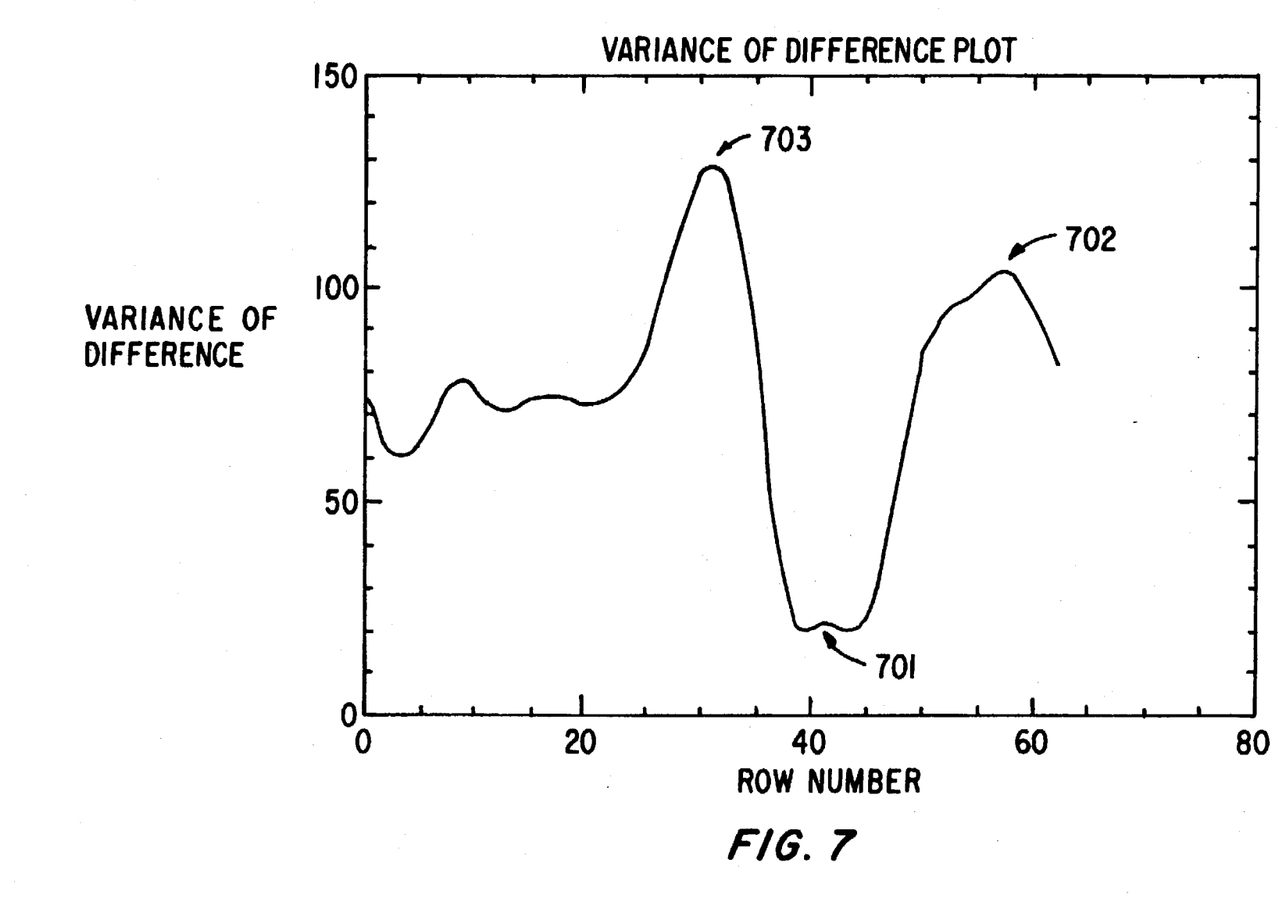
FIG. 7 is a variance of difference plot between the object motion and the sampled heart motion.
Figure 8:
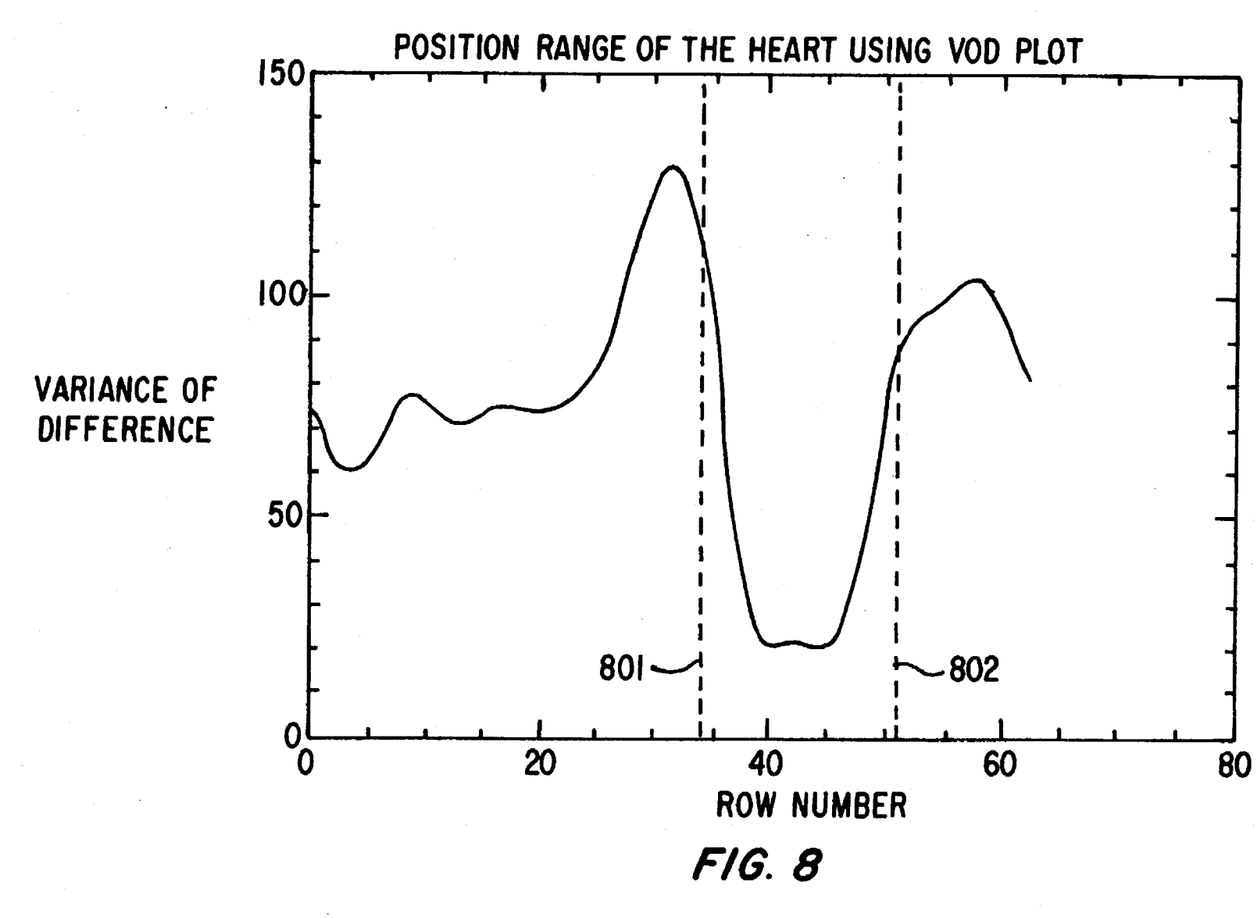
FIG. 8 is a graph of the position range of a heart using a variance of difference plot.
Figure 9:
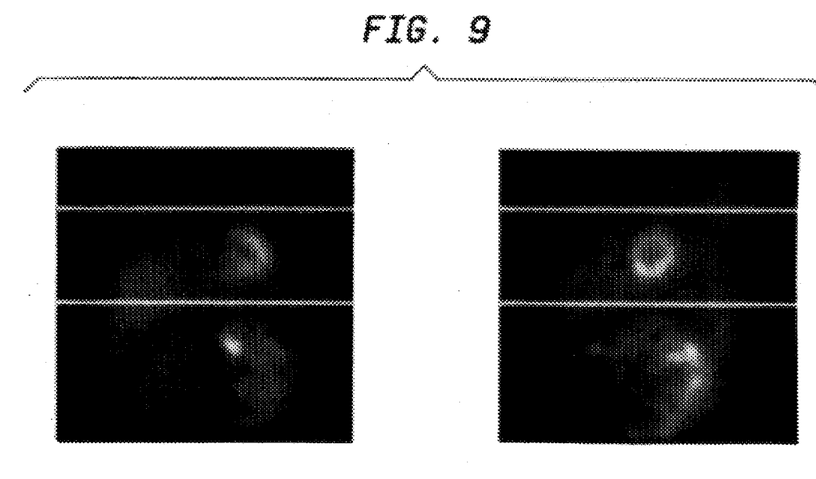
FIG. 9 shows an overlaying of the position range with two of the projection images.

The comparison between the potential heart position in FIG. 5 and the standard 1-D motion plot (FIG. 6) is shown as a variance difference plot in FIG. 7 (indicated as step 105 in FIG. 1). As discussed above, the variance difference for similar features will be low, such as the center of the heart. The lowest part of the curve 701 from row numbers 40 to 45 indicates the proximity of the center of the heart sampled. The rough position range limits of the heart are indicated by the peak portions of the curve 702 and 703. The horizontal coordinates or the index of projection images coordinates corresponding to the range position limits 801 and 802 of the heart sampled are receded away from the peaks 702 and 703, as shown in FIG. 8, toward the proximate center of the heart 701 in proportion to the image intensity band 502 in FIG. 5. Hence, for the variance of difference plot of FIG. 8, the dashed vertical lines 801 and 802, approximately corresponding to index numbers 34 and 51 respectively, approximate the size of band 502. The index numbers 34 and 51, in FIG. 8, correspond to the projection images of the upper and lower limits of the position range of the heart (indicated as step 106 in FIG. 1), as shown in FIG. 9 (which are images 417 and 433 in FIG. 4).

It should be understood that the embodiment described herein is merely exemplary and that a person skilled in the art may make many variations and modifications to this embodiment utilizing functionally equivalent elements to those described herein. Any and all such variations or modifications as well as others which may become apparent to those skilled in the art, are intended to be included within the scope of the invention as defined by the appended claims.

What is claimed is:

1. A method for determining a position range of a heart from a sequence of projection images of said heart indicative of projecting angles and spatial locations of said heart, comprising the steps of:

generating a predetermined number of said projection images of said heart at multiple said projection angles for deriving a one dimensional pseudo motion analysis of said heart;

comparing said one dimensional pseudo motion analysis of said heart against a standard one dimensional pseudo motion for determining a variance of said one dimensional pseudo motion analysis of said heart from said standard one dimensional pseudo motion; and, determining said position range of said heart from said variance.

2. The method of claim 1, wherein said one dimensional pseudo motion analysis includes an intensity feature to position mapping having a horizontal direction representing the indices of said projection images and a vertical direction indicative of said column position for said projected images.

3. The method of claim 2, wherein said intensity feature to position mapping is formed from a matrix representation with predetermined rows and columns of said predetermined number of projection images with values in said intensity feature to position mapping being one position of said predetermined columns of the maximum intensity value at each of said predetermined rows.

4. The method of claim 2, wherein said variance is a difference plot relating said variance to an index indicative of each of said projection images.

5. The method of claim 4, wherein said position range of said heart, being upper and lower limit positions of said heart, is detected by receding from peaks in said variance of difference plot towards said proximate center in proportion to an image intensity band in said intensity feature to position mapping.

6. The method of claim 2, wherein said variance is a difference plot indicating the proximate center of said heart at the lowest variance of difference.

7. The method of claim 1, wherein said standard one dimensional pseudo motion is an estimate of the heart motion derived from a large number of sampled heart motions, said standard one dimensional pseudo motion representing a signature at the center of the heart.

8. The method of claim 1, wherein said projection images are derived by single photon emission computed tomography.

9. The method of claim 1, further including the step of overlaying two of said projection images corresponding to upper and lower limits of said position range of said heart.

10. A method for determining a position range of a heart from a sequence of projection images of said heart having intensity distributions indicative of projecting angles and spatial locations of said heart, comprising the steps of:

creating a one to one correspondence of intensity feature to position mapping of maximum intensity values of said projection images;

comparing said intensity feature to position mapping against a standard one dimensional pseudo motion for determining a variance of said one dimensional pseudo motion of said heart from said standard one dimensional pseudo motion; and, determining said position range of said heart from said variance.

11. The method of claim 10, wherein said intensity feature to position mapping has a horizontal direction representing the indices of said projection images and a vertical direction indicative of column position for said projected images.

12. The method of claim 10, wherein said standard one dimensional pseudo motion is an estimate of the heart motion derived from a large number of sampled heart motions.

13. The method of claim 10, wherein said variance is a difference plot related to an index indicative of each of said projection images, said difference plot having a low point indicative of the proximate center of said heart.

14. The method of claim 13, wherein said position range includes upper and lower limits determined by receding from two peaks in said difference plot, towards said proximate center of said heart in proportion to an image intensity band in said intensity feature to position mapping.

15. The method of claim 10, wherein said projection images are obtained by single photon emission computed tomography images of said heart.

16. The method of claim 10, further including the step of overlaying two of said projection images corresponding to upper and lower limits of said position range of said heart.

17. A method for determining the position range of a heart from a sequence of projection images having intensity distributions indicative of projecting angle and spatial location of said heart to rotation axis of said projecting angle, comprising the steps of:

obtaining a predetermined number of said projection images of said heart from multiple said projection angles about said heart;

forming said predetermined number of projection images into a matrix of predetermined rows and columns;

recording for each said predetermined row the column position of the projection image with a maximum intensity value for generating an intensity feature to position mapping;

calculating a variance of difference for said intensity feature to position mapping from a standard one dimensional pseudo motion; and, determining the position range of said heart from said variance of difference.

18. The method of claim 17, wherein said projection images are obtained by single photon emission computed tomography.

19. The method of claim 17, wherein said intensity feature to position mapping has a horizontal direction representing the indices of said projection images and a vertical direction indicative of said column position for said projected images.

20. The method of claim 19, wherein said standard one dimensional pseudo motion is an estimate of the heart motion derived from a large number of sampled heart motions.

21. The method of claim 20, wherein said variance of difference is a plot related to an index indicative of each of said projection images, said plot having a low point indicative of the proximate center of said heart.

22. The method of claim 21, wherein said position range includes upper and lower limits determined by receding from two peaks in said difference plot, towards said proximate center of said heart in proportion to an image intensity band in said intensity feature to position mapping.

23. The method of claim 17, further including the step of overlaying two of said projection images corresponding to upper and lower limits of said position range of said heart.

* * * * *

--- with the environment and, particularly otherwise when the dominant intensity comes from surrounding organs such as the liver or spleen. Accordingly, a method is needed for determining the position range of the heart which is insensitive to the intensity distribution of projected images obtained.

Under the present method a series of projection images are generally acquired at uniformly spaced angular positions around the patent's body. In 3-D tomographic myocardial studies, using single photon emission computed tomography (SPECT) techniques, a plane circular orbit around the patient is commonly used for the imaging camera. The present method uses information form one dimensional (1-D) pseudo motion that is derived from the above series of projection images to identify the position range of the heart. The present method is independent of the reconstruction algorithms employed by the imaging methods used and, negates the intensity distribution in the projected images from imaging sources.

Referring now to FIG. 1 there is shown a flowchart of the steps in accord with the present method. The steps 100 images is indicated by the intensity of the pixels making up the image. All these projection images 401–464 in their angular sequence represent a 3-D image of the heart's various positions while functioning to pump blood. The maximum image intensity value 102 for each row is calculated and recorded with the corresponding column position 103. When the image intensities of all the pixel images are calculated and saved 104 the process undertakes a comparative determination for the position range of the heart.

The shape and the intensity distribution of the object in the projection images depend not only on the projecting angle but also on the spatial location of the object to the rotation axis. The present method assumes that the heart is a compact object with respect to its surrounding structure and the intensity distribution of the heart will not be affected by the shape changing in different projection images. Hence the maximum intensity value of the image is used in the present method as an example to describe the object in the sequence of projection images. The changes of pixel position of the maximum values represent the heart motion in the sequence of projection images.